US012548498B2

(12) United States Patent
Lim et al.

(10) Patent No.: US 12,548,498 B2
(45) Date of Patent: Feb. 10, 2026

(54) DISPLAY DEVICE AND METHOD OF MANUFACTURING THE SAME

(71) Applicant: SAMSUNG ELECTRONICS CO., LTD., Suwon-si (KR)

(72) Inventors: Sungjin Lim, Suwon-si (KR); Seungjun Jeong, Suwon-si (KR); Hyun Kang, Suwon-si (KR); Woosuk Ko, Suwon-si (KR); Myeonggu Kim, Suwon-si (KR); Namwoo Park, Suwon-si (KR); Yongcheol Park, Suwon-si (KR); Wanhee Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/780,074

(22) Filed: Jul. 22, 2024

(65) Prior Publication Data

US 2025/0104609 A1 Mar. 27, 2025

Related U.S. Application Data

(63) Continuation of application No. PCT/KR2024/008871, filed on Jun. 26, 2024.

(30) Foreign Application Priority Data

Sep. 26, 2023 (KR) ........................ 10-2023-0129479

(51) Int. Cl.
*G09G 3/32* (2016.01)

(52) U.S. Cl.
CPC ........... *G09G 3/32* (2013.01); *G09G 2310/08* (2013.01); *G09G 2320/0233* (2013.01); *G09G 2320/0276* (2013.01); *G09G 2320/0626* (2013.01)

(58) Field of Classification Search
CPC ............. G09G 3/32; G09G 2320/0233; G09G 2310/08; G09G 2320/0626; G09G 3/006; G09G 2320/0276
See application file for complete search history.

(56) References Cited

U.S. PATENT DOCUMENTS 7,623,216 B2 11/2009 Hwang
9,519,164 B2 12/2016 Al-Dahle et al.
(Continued)

FOREIGN PATENT DOCUMENTS

CN 111341271 A 6/2020
KR 10-1201314 B1 11/2012
(Continued)

OTHER PUBLICATIONS

International Search Report (PCT/ISA/210) issued Sep. 30, 2024 by the International Searching Authority in International Patent Application No. PCT/KR2024/008871.
(Continued)

*Primary Examiner* — Muhammad N Edun
(74) *Attorney, Agent, or Firm* — Sughrue Mion, PLLC

(57) ABSTRACT

A method of manufacturing including: generating first compensation data based on pre-stored first mura data; displaying a test image according to the first compensation data; generating second mura data based on the displayed test image; generating second compensation data based on the second mura data; generating integrated compensation data based on a combination of the first compensation data and the second compensation data; and compensating for a luminance of the display device based on the integrated compensation data.

20 Claims, 10 Drawing Sheets

(56) References Cited

U.S. PATENT DOCUMENTS

| | | | | |
|---|---|---|---|---|
| 9,576,541 | B2 | 2/2017 | Chung et al. | |
| 10,733,763 | B2 | 8/2020 | Lee et al. | |
| 11,170,687 | B2 | 11/2021 | Heo et al. | |
| 11,189,222 | B1 * | 11/2021 | Aogaki | G09G 3/3208 |
| 11,210,982 | B2 | 12/2021 | Zheng et al. | |
| 12,106,727 | B2 | 10/2024 | Chen | |
| 2018/0047368 | A1 * | 2/2018 | Luo | G09G 3/20 |
| 2021/0358406 | A1 * | 11/2021 | Zhang | G09G 3/3233 |
| 2023/0118591 | A1 | 4/2023 | Park et al. | |
| 2024/0071278 | A1 | 2/2024 | Park et al. | |

FOREIGN PATENT DOCUMENTS

| | | | |
|---|---|---|---|
| KR | 10-1503137 | B1 | 3/2015 |
| KR | 10-1585680 | B1 | 1/2016 |
| KR | 10-2019-0141776 | A | 12/2019 |
| KR | 10-2020-0030774 | A | 3/2020 |
| KR | 10-2020-0066850 | A | 6/2020 |
| KR | 10-2181881 | B1 | 11/2020 |
| KR | 10-2021-0109073 | A | 9/2021 |
| KR | 10-2334575 | B1 | 12/2021 |
| KR | 10-2022-0068159 | A | 5/2022 |
| KR | 10-2023-0053192 | A | 4/2023 |
| KR | 10-2023-0133388 | A | 9/2023 |
| WO | 2023/108672 | A1 | 6/2023 |

OTHER PUBLICATIONS

Written Opinion (PCT/ISA/237) issued Sep. 30, 2024 by the International Searching Authority in International Patent Application No. PCT/KR2024/008871.

* cited by examiner

DISPLAY DEVICE AND METHOD OF MANUFACTURING THE SAME

CROSS REFERENCE TO RELATED APPLICATIONS

This application is a continuation application, claiming priority under § 36(c), of International application No. PCT/KR2024/008871 filed on Jun. 26, 2024, which is based on and claims from the benefit of a Korean patent application number 10-2023-0129479, filed on Sep. 26, 2023, in the Korean Intellectual Property Office, the disclosures of which is incorporated by reference herein in its entirety.

BACKGROUND

1. Field

Various embodiments of the disclosure relate to techniques of compensating for luminance of a display device, and more particularly, to a display device that may compensate for luminance to remove stains or mura (e.g., unevenness), and a method for manufacturing such a display device.

2. Description of Related Art

With the development of digital technology, various types of electronic devices, such as smart TVs, smart phones, tablet PCs, electronic notebooks, personal digital assistants (PDAs), or wearable devices, are being used. In particular, various types of electronic devices may be implemented as display devices that output images to a display panel based on input data.

A display device can provide various information in a visual form to a user. In general, the display device may include a plurality of components to display various information using electrical signals. For example, the plurality of components may include a plurality of pixels arranged in a display panel. In an ideal display panel, if a plurality of pixels are provided with the same signal, the plurality of pixels may output light at the same luminance. However, in an actual display panel, due to errors in its manufacturing process or various environmental factors, the plurality of pixels may not output light at the same luminance for the same signal. For example, stains or mura may be visible on the display panel due to uneven luminance between the plurality of pixels. The uneven luminance of the display panel may be represented by mura on the display panel. Therefore, there is a need for a technique (or method) of removing stains or mura, that may be visible on a display panel, by compensating for the luminance between a plurality of pixels.

SUMMARY

Various embodiments of the disclosure may provide a display device that performs a luminance compensation based on compensation data reflecting mura detected in a manufacturing process of the display device and mura detected in an operating process of the display device, and a manufacturing method thereof.

According to an aspect of the disclosure, a method of manufacturing a display device may include: generating first compensation data based on pre-stored first mura data; displaying a test image according to the first compensation data; generating second mura data based on the displayed test image; generating second compensation data based on the second mura data; generating integrated compensation data based on a combination of the first compensation data and the second compensation data; and compensating for a luminance of the display device based on the integrated compensation data.

The first mura data may include data of a cell mura based on a manufacturing process of the display device.

The second mura data may include data of a backlight unit mura based on an operation process of the display device.

The first compensation data may include luminance correction data for at least one gray level of at least one unit pixel group included in the display device, and be used for 4-plane compensation for a first gray level, a second gray level, a third gray level, and a fourth gray level of the at least one unit pixel group.

The second compensation data may include luminance correction data for at least one gray level of at least one unit pixel group included in the display device, and be used for 5-plane compensation for a first gray level, a second gray level, a third gray level, a fourth gray level, and a fifth gray level of the at least one unit pixel group.

The first compensation data and the second compensation data include at least one of a LUP map corresponding to mura data, magnitude data including a luminance compensation amount for at least one unit pixel group, and offset data for adjusting the luminance compensation amount.

The generating the integrated compensation data may include: extracting the LUT map, the magnitude data, and the offset data by decoding the first compensation data and the second compensation data, combining the magnitude data of the first compensation data and the magnitude data of the second compensation data, based on the summation algorithm, and combining the offset data of the first compensation data and the offset data of the second compensation data, based on the summation algorithm.

The generating the integrated compensation data may further include encoding the at least one of the combined map, the combined magnitude data, and the combined offset data.

The compensating for the luminance of the display device may include: receiving the integrated compensation data including at least one of an LUT map, magnitude data, and offset data, controlling a luminance of the image corresponding to input data based on the offset data, and controlling a gradation of the image corresponding to the input data based on the LUP map or the magnitude data.

The method may further include: displaying the test image according to the integrated compensation data; generating complementary luminance data based on the displayed test image; generating third mura data based on the complementary luminance data; generating third compensation data based on the third mura data; generating complementary integrated compensation data based on a combination of the first compensation data, the second compensation data, and the third compensation data; and compensating for the luminance of the display device based on the complementary integrated compensation data.

According to an aspect of the disclosure, a display device may include: a display panel configured to display an image; a timing controller configured to control a data signal and a gate signal; and a luminance compensator configured to compensate for a luminance of the image displayed on the display panel, where the luminance compensator is configured to generate first compensation data based on pre-stored first mura data, where the display panel is configured to display a test image according to the first compensation data, and where the luminance compensator is configured to: generate second mura data based on luminance data including a luminance distribution of the displayed test image, generate second compensation data based on the second mura data, generate integrated compensation data based on a combination of the first compensation data and the second compensation data, and compensate for the luminance of the image displayed on the display panel based on the integrated compensation data.

The first mura data may include data of a cell mura based on a manufacturing process of the display device.

The second mura data may include data of a backlight unit mura based on an operation process of the display device.

The first compensation data and the second compensation data may include luminance correction data for at least one gray level of at least one unit pixel group included in the display device.

The luminance compensator may be further configured to: generate the first compensation data to be used for 4-plane compensation for a first gray level, a second gray level, a third gray level, and a fourth gray level of the at least one unit pixel group; and generate the second compensation data to be used for 5-plane compensation for the first gray level, the second gray level, the third gray level, the fourth gray level, and a fifth gray level of the at least one unit pixel group.

The first compensation data and the second compensation data may include at least one of a LUT map corresponding to mura data, magnitude data including a luminance compensation amount for at least one unit pixel group, and offset data based on adjusting the luminance compensation amount.

The luminance compensator may be further configured to: extract the LUT map, the magnitude data, and the offset data, by decoding the first compensation data and the second compensation data, combine the LUT map of the first compensation data and the LUT map of the second compensation data based on a summation algorithm, combine the magnitude data of the first compensation data and the magnitude data of the second compensation data based on the summation algorithm, and combine the offset data of the first compensation data and the offset data of the second compensation data based on the summation algorithm.

The luminance compensator may generate the integrated compensation data may include encoding the at least one of the combined map, the combined magnitude data, and the combined offset data.

The timing controller may be further configured to: receive the integrated compensation data including at least one of an LUT map, magnitude data, and offset data from the luminance compensator, control a luminance of the image corresponding to input data based on the offset data, and control a gradation of the image corresponding to the input data based on at least one of the LUT map and the magnitude data.

The display panel may be further configured to display the test image according to the integrated compensation data, and the luminance compensator may be further configured to: generate third mura data based on complementary luminance data including a luminance distribution of the displayed test image, generate third compensation data based on the third mura data, generate complementary integrated compensation data based on a combination of the first compensation data, the second compensation data, and the third compensation data, and additionally compensates for the luminance of the image displayed on the display panel based on the complementary integrated compensation data.

According to various embodiments of the disclosure, a display device and a manufacturing method thereof may generate first compensation data for removing (e.g., correcting or remedying) cell mura that took place during a manufacturing process, generate second compensation data for removing a backlight unit mura detected in an operating process, and perform luminance compensation based on a integrated compensation data obtained by summing (e.g., combining) the first compensation data and the second compensation data.

Accordingly, the display device of the disclosure and the manufacturing method thereof may eliminate mura in the display device through the integrated compensation data obtained by combining the compensation data for the cell mura and the compensation data for the backlight unit mura, thereby improving the problem of the mura being visible and enhancing its display quality.

The effects that can be obtained from example embodiments of the disclosure are not limited to those described above, and other effects not mentioned herein may be clearly derived and understood by those having ordinary knowledge in the technical field to which example embodiments of the disclosure belong from the following description. In other words, unintended effects of practicing the example embodiments of this disclosure may be also derived from the example embodiments by those having ordinary knowledge in the art.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
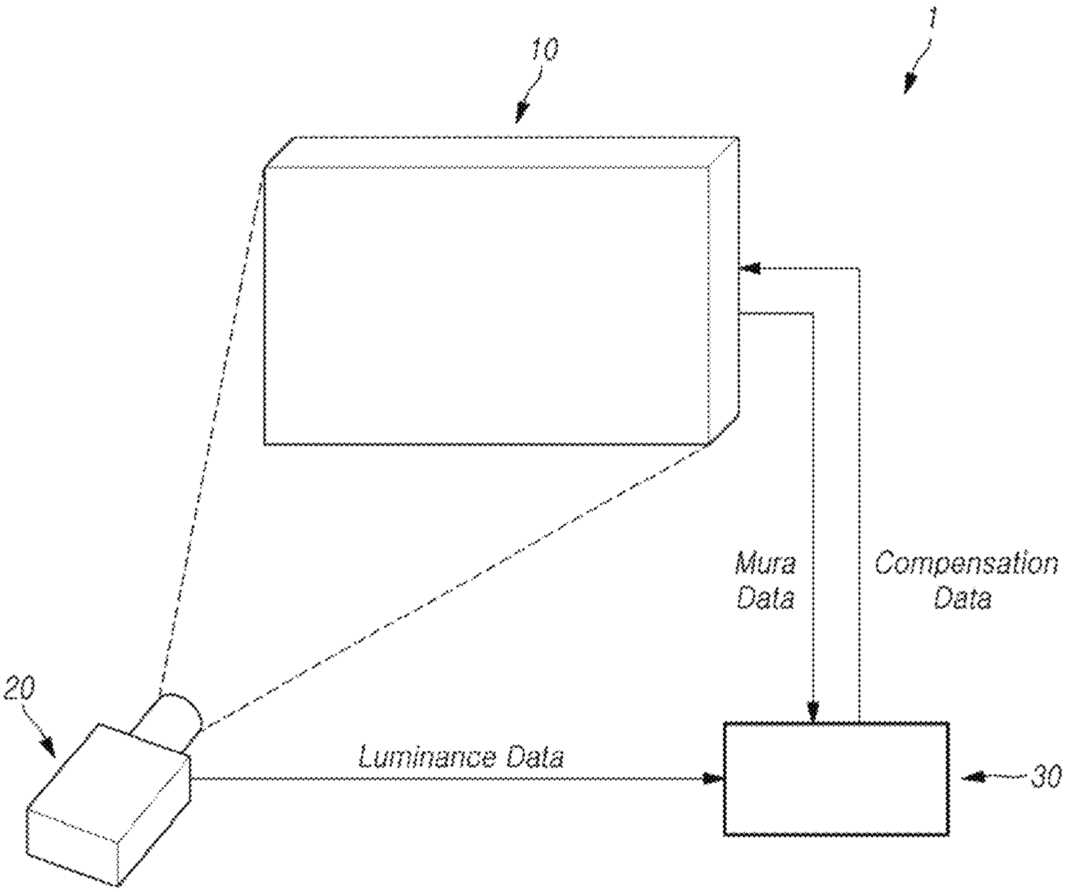
FIG. 1 is a diagram illustrating an example configuration of a display system according to one or more embodiments.

Hereinafter, embodiments of the disclosure will be described in detail with reference to the accompanying drawings so that those skilled in the art to which the disclosure pertains may easily practice the same. However, the disclosure may be implemented in various different forms and is not limited to the embodiments described herein. With regard to the description of drawings, the same or similar reference numerals may be used for the same or similar components. Further, in the drawings and their related descriptions, descriptions of well-known functions and configurations may be omitted for clarity and brevity.

It is to be understood that "sum" or "summation" are not limited to addition in the mathematical sense but may refer to any form of combination or aggregation.

Figure 2:
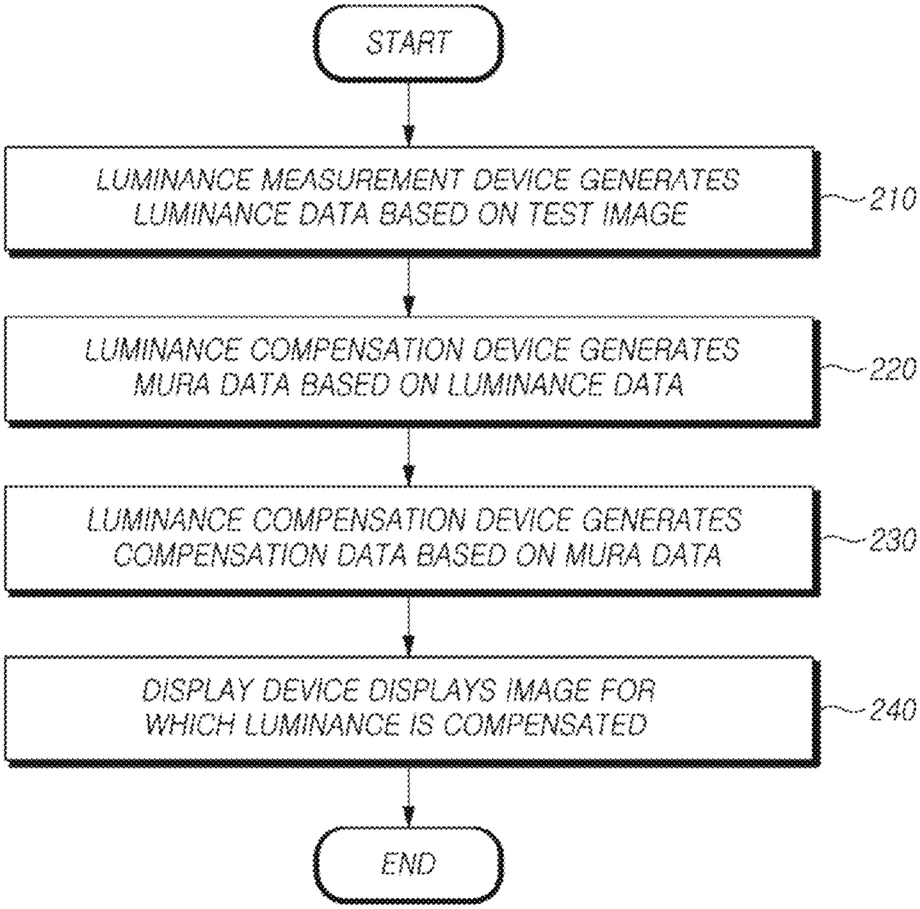
FIG. 2 is a sequence diagram illustrating an example operating sequence of a display system according to one or more embodiments.

FIG. 1 illustrates an example configuration of a display system 1 according to one or more embodiments. FIG. 2 illustrates an example operating sequence of the display system 1 according to one or more embodiments.

Referring to FIGS. 1 and 2, the display system 1 may include a display device 10 for displaying an image corresponding to input data, a luminance measurement device 20 for measuring luminance of the display device 10, and a luminance compensation device 30 for compensating the luminance of the display device 10. The display system 1 may perform a luminance compensation of the display device 10, based on compensation data reflecting both mura detected (e.g., identified) in a manufacturing process and mura detected (e.g., identified) in an operating process of the display device 10.

FIG. 1 illustrates the display device 10 and the luminance compensation device 30 as separate and independent configurations, but in accordance with embodiments, the display device 10 and the luminance compensation device 30 may be implemented as a single configuration. For example, the luminance compensator 30 may be incorporated (e.g., integrated) into the display device 10 and may be a partial component (such as a luminance compensator 600 of FIG. 3) of the display device 10.

According to an embodiment, in operation 210, the luminance measurement device 20 may generate luminance data based on a test image. For example, the luminance measurement device 20 may measure the luminance of the test image displayed by the display device 10. The luminance measurement device 20 may generate the luminance data based on luminance measured for each position of the display device 10 with respect to the test image. The luminance measurement device 20 may transmit the luminance data to the luminance compensation device 30.

The luminance measurement device 20 may be at least one of a contact type measurement device and a non-contact type measurement device. For example, the luminance measurement device 20 may be a contact type measurement device configured to contact a side (e.g., surface) of the display device 10 by using at least one of a measurement sensor or a probe and measure a change (or variation) in luminance of the display device 10 by using an optical sensor. For example, the luminance measurement device 20 may be a non-contact type measurement device configured to measure the change in luminance of the display device 10 from a predetermined distance, based on an optical system including at least one of a lens, a camera, or a spectrometer. For example, the luminance measurement device 20 may be implemented with a charged coupled device (CCD) camera. In such a case, the luminance measurement device 20 may include a plurality of CCD imaging elements, and each of the CCD imaging elements may measure the change in luminance in response to light emitting pixels. For example, the luminance measurement device 20 may be a spectral photometer that measures change in luminance of the display device 10 by detecting the intensity of light passing through an optical filter. For example, the luminance measurement device 20 may be a photoelectric color measurement device that separates light of the test image into wavelength components and detects the intensity of each wavelength component to measure the change in luminance of the display device 10.

According to an embodiment, in operation 220, the luminance compensation device 30 may generate data related to mura (or mura data) based on the luminance data. For example, the luminance compensation device 30 may receive luminance data from the luminance measurement device 20. For example, the luminance compensation device 30 may analyze the change in luminance for each position of the test image displayed on the display device 10 based on the luminance data. The luminance compensation device 30 may generate mura data including position information and luminance information for a mura area having a higher luminance compared to a surrounding area or a lower luminance compared to the surrounding area.

According to an embodiment, in operation 230, the luminance compensation device 30 may generate compensation data based on the mura data. For example, the luminance compensation device 30 may generate compensation data for compensating the luminance for each position of the display device 10, based on the luminance information and the position information for the mura area included in the mura data generated based on the luminance data. As another example, the luminance compensation device 30 may generate the compensation data for compensating the luminance for each position of the display device 10, based on the position information and the luminance information for the mura area included in the mura data received from the display device 10.

In an embodiment, the luminance compensation device 30 may generate first compensation data for removing (e.g., correcting or remedying) the cell mura that took place during the manufacturing process. Further, the luminance compensation device 30 may generate second compensation data for removing the backlight unit mura detected in the operating process. For example, the compensation data may include luminance correction data for at least one gray level of at least one unit pixel group included in the display device 10. The luminance compensation device 30 may transmit the compensation data to the display device 10.

According to an embodiment, in operation 240, the display device 10 may display an image which has had the luminance compensated. For example, the display device 10 may receive the compensation data from the luminance compensation device 30. For example, the display device 10 may control the luminance of the image corresponding to input data based on the compensation data. For example, the display device 10 may control gradation of the image corresponding to the input data based on the compensation data.

In an embodiment, the display device 10 may control the luminance (e.g., the brightness and the gradation) of the image corresponding to the input data based on the integrated data obtained by adding (e.g., combining or considering) the first compensation data for removing (e.g., correcting or remedying) the cell mura which occurred during the manufacturing process and the second compensation data for removing the backlight unit mura detected in the operating process.

As described above, the display system 1, according to an embodiment, may remove the mura of the display device 10 through the integrated compensation data, thereby eliminating (or reducing) the problem of the mura being visible and thus improving the display quality.

Figure 3:
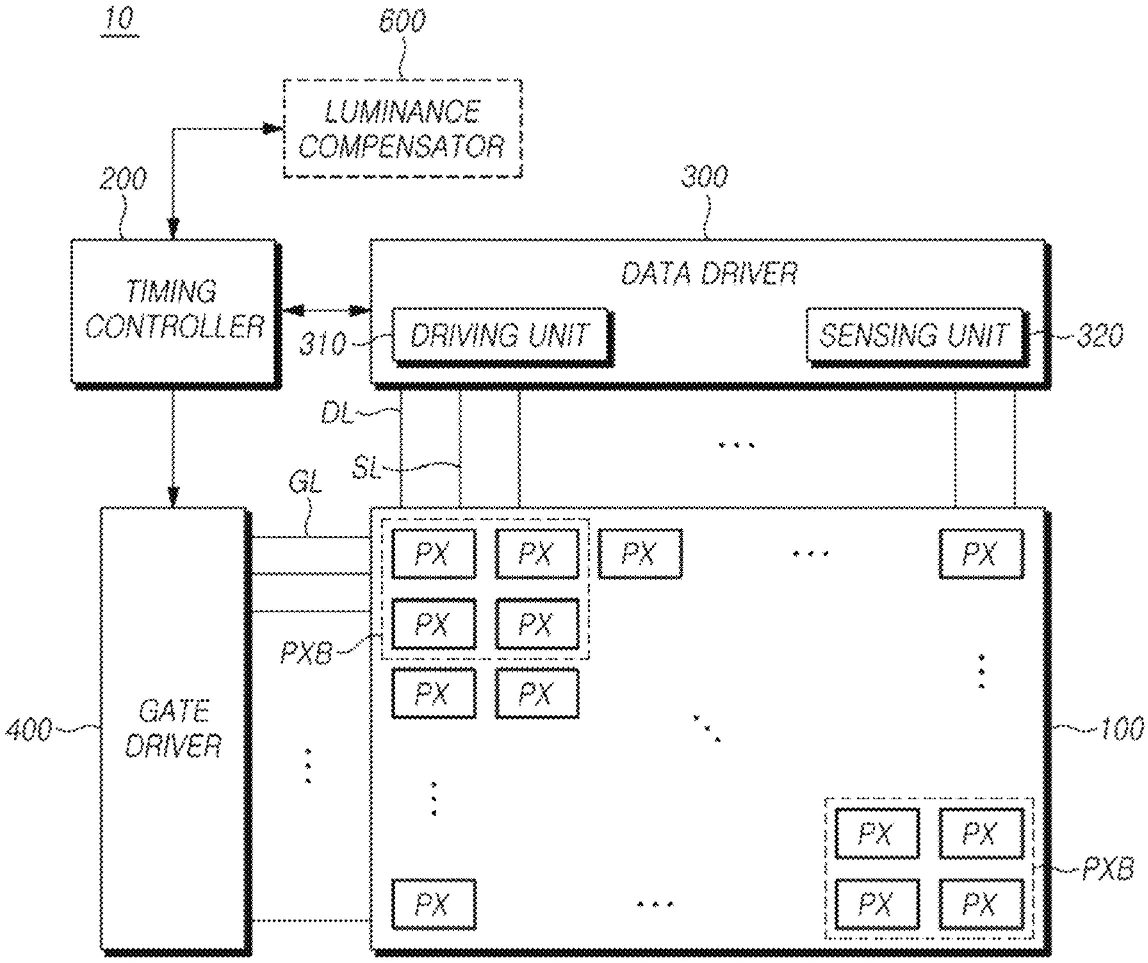
FIG. 3 is a diagram illustrating example components of a display device according to one or more embodiments.

FIG. 3 is a diagram illustrating example components of a display device according to one or more embodiments.

Referring to FIG. 3, the display device 10 may include a display panel 100, a timing controller 200, a data driver 300, and a gate driver 400. Further, according to an embodiment, the display device 10 may further include a luminance compensator 600. According to various embodiments, the display panel 100, the timing controller 200, the data driver 300, and the gate driver 400 may be implemented as a single module. For example, the timing controller 200, the data driver 300, and the gate driver 400 may be mounted on a circuit film, such as a Tape Carrier Package (TCP), a Chip On Film (COF), or a Flexible Print Circuit (FPC), and may be attached to the display panel 100 by a Tape Automatic Bonding (TAB) or mounted on a non-display area of the display panel 100 by a Chip On Glass (COG) method.

The display panel 100 may include a plurality of signal lines, such as a plurality of gate lines GL, a plurality of data lines DL, and a plurality of sensing lines SL and may include a plurality of pixels PX which are connected to the plurality of signal lines and arranged in a matrix form, for example, a pixel array. The plurality of pixels PX may display one of red, green, or blue, and a pixel displaying red, a pixel displaying green, and a pixel displaying blue may be repeatedly arranged one after another. Further, the light of a certain color in which red, green, and blue lights, displayed in adjacent pixels PX, are mixed together. According to various embodiments, pixels displaying red, green, and blue may be referred to as red subpixels, green subpixels, and blue subpixels, respectively, and a group of red subpixels, green subpixels, and blue subpixels may be referred to as pixels. For example, the plurality of pixels PX may display any one of red, green, blue, or white. However, the disclosure is not limited thereto, and a configuration of colors that may be displayed by pixels may be freely adopted within the scope of conventional technology.

The display panel 100 may include, for example, an organic light emitting diode (OLED) display panel in which each of the pixels PX includes a light emitting device. However, the disclosure is not limited thereto, and the display panel 100 may include at least one display panel of a liquid crystal display (LCD), a light emitting diode (LED), a light emitting polymer display (LPD), an organic light emitting diode (OLED), an active-matrix organic light emitting diode (AMOLED), or a flexible LED (FLED).

The timing controller 200 may control the overall operation of the display device 10 and may also control driving timing of the data driver 300 and the gate driver 400 based on control commands received from an external processor, for example, a main processor or an image processor of an electronic device equipped with the display device 10. The timing controller 200 may be implemented with a hardware, software, or a combination of a hardware and software, and for example, the timing controller 200 may be implemented with digital logic circuits and registers that perform functions described below.

The timing controller 200 may provide a data driver control signal to the data driver 300, and the operation and operational timing of a driving unit 310 and a sensing unit 320 of the data driver 300 may be controlled in response to the data driver control signal. The timing controller 200 may provide a gate driver control signal to the gate driver 400. The gate driver 400 may drive a plurality of gate lines GL of the display panel 100 in response to the gate driver control signal. The timing controller 200 may perform various image processing operations, including changing a format of the image data, reducing the power consumption, and compensating for luminance with respect to the image data received from the external processor. For example, the image data may include input data corresponding to each pixel PX, and the timing controller 200 may perform data compensation for the image data of each pixel PX and provide the compensated data to the data driver 300, for compensating for the luminance of the plurality of pixels PX of the display panel 100. To this end, the timing controller 200 may include a storage unit (not shown). For example, the storage unit of the timing controller 200 may be implemented with a memory.

In an embodiment, the timing controller 200 may receive compensation data from the luminance compensator 600. For example, the luminance compensator 600 may have substantially the same configuration as the luminance compensator 30 of FIG. 1. For example, the compensation data may include a compensation value for removing the mura based on the mura data of the display panel 100. For example, the timing controller 200 may perform data compensation for the image data based on the compensation data and provide the compensated data to the data driver 300. Specifically, the timing controller 200 may segment a plurality of pixels PX into a plurality of pixel blocks PXB and apply compensation data in units of the plurality of pixel blocks PXB, thereby controlling the luminance and gradation of the image data.

The data driver 300 may include the driving unit 310 and the sensing unit 320. The data driver 300 may drive the plurality of pixels PX through a plurality of data lines DL based on the data driver control signal received from the timing controller 200. The data driver 300 may detect (e.g., measure) electrical characteristics of the plurality of pixels PX through a plurality of sensing lines SL based on the data driver control signal received from the timing controller 200.

The driving unit 310 may, from digital-to-analog, convert image data received from the timing controller 200, for example, compensated input data for each of the plurality of pixels PX, and then provide the converted analog signals of driving signals to the display panel 100 through the plurality of data lines DL.

The timing controller 200 may operate the data driver 300 either in a display mode for displaying an image or a sensing mode for performing a sensing (e.g., detection) process (or operation). For example, in the display mode, the driving unit 310 may convert image data provided from the timing controller 200 into driving signals (e.g., driving voltages) and then output the driving voltages to the data lines DL of the display panel 100. For example, in the sensing mode, the driving unit 310 may convert internally-set sensing data provided from the timing controller 200 into driving signals (e.g., driving voltages) and then output the driving voltages to the data lines DL of the display panel 100.

In an embodiment, the timing controller 200 may transmit a sensing control signal to the driving unit 310 to perform a sensing process, and accordingly, the sensing unit 320 may detect the electrical characteristic of each pixel PX through a sensing line SL and transmit a measured sensing value to the timing controller 200. The sensing control signal may include a sensing period, a position of a sensing pixel block, a sensing scheme, and the like. The sensing scheme may include, for example, at least one of measuring a threshold voltage of a driving transistor provided in the pixel PX, measuring a potential difference between both ends of a light emitting device provided in the pixel PX, and measuring an amount of current or mobility flowing through the light emitting device.

The sensing unit 320 may receive a sensing signal indicating the electrical characteristic of each of the plurality of pixels PX, for example, a pixel voltage or a pixel current, through the plurality of sensing lines SL, and then generate sensing data by analog-to-digital converting the sensing signal. For example, the sensing data may include at least one of a threshold voltage of a driving transistor provided in a pixel, a potential difference between both ends of a light emitting device provided in the pixel, and an amount or mobility of current flowing through the light emitting device.

The gate driver 400 may drive a plurality of gate lines GL of the display panel 100 using the gate driver control signal received from the timing controller 200. Based on the gate driver control signal, the gate driver 400 may provide pulses of a gate-on voltage (e.g., a scan voltage or a sensing-on voltage) to a corresponding gate line GL, during a corresponding driving period of each of the plurality of gate lines GL.

Figure 4:
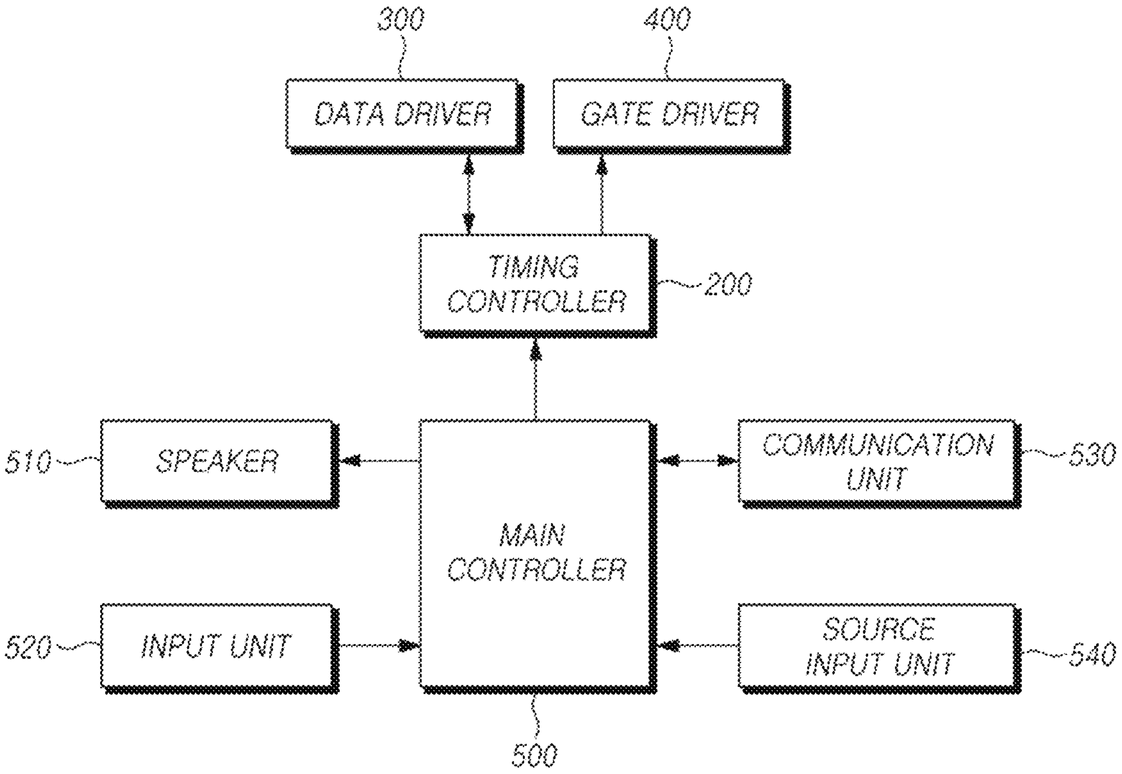
FIG. 4 is a block diagram of an example display device according to one or more embodiment.

FIG. 4 illustrates an example block configuration of the display device 10 according to one or more embodiments.

Referring to FIG. 4, the display device 10, according to an embodiment, may include the timing controller 200, the data driver 300, and the gate driver 400, as described above, and may further include a main controller 500 configured to control the timing controller 200, a communication unit 530 for communicating with an external device, a source input unit 540 for receiving a source image, a speaker 510 for outputting sound, and an input unit 520 for receiving commands for controlling the display device 10 from a user.

The input unit 520 may include a button or a touch pad provided in a specified area of the display device 10, and if the display panel 100 is implemented as a touch screen, the input unit 520 may include a touch pad provided on a front side (e.g., surface) of the display panel 100. Further, the input unit 520 may include a remote controller for receiving a user input and/or a microphone for receiving a voice command.

The input unit 520 may receive various commands from the user for controlling the display device 10, such as, power on/off, volume up/down, channel selection, screen adjustment, and change settings of the display device 10. The speaker 510 may output sound in synchronization with the image output from the display panel 100 under the control of the main controller 500.

The communication unit 530 may communicate with a relay server or another electronic device to transmit and/or receive necessary data. The communication unit 530 may utilize at least one of various wireless communication schemes such as e.g., 3rd Generation (3G), 4th Generation (4G), Wireless LAN, Wi-Fi, Bluetooth, Zigbee, Wi-Fi Direct (WFD), Ultra-Wideband (UWB), Infrared Data Association (IrDA), Bluetooth Low Energy (BLE), Near Field Communication (NFC), or Z-Wave. Further, the communication unit 530 may utilize a wired communication scheme such as a Peripheral Component Interconnect (PCI), PCI-express, and a Universal Serial Bus (USB).

The source input unit 540 may receive a source signal input from a game console, a set-top box, a USB, an antenna, or the like. Accordingly, the source input unit 540 may include at least one selected from a group of source input interfaces including a high-definition multimedia interface (HDMI) cable port, a USB port, an antenna, and the like. A source signal received by the source input unit 540 may be processed by the main controller 500 to be converted into a form capable of being outputted by the display panel 100 and the speaker 510.

The main controller 500 and the timing controller 200 may include at least one memory for storing programs and various data for performing the above-described operations and the operations to be described below, and at least one processor for executing the stored programs. The memory making up the main controller 500 and the timing controller 200 may include a volatile memory, such as a static random access memory (S-RAM) and a dynamic random access memory (D-RAM), and a non-volatile memory, such as a read only memory (ROM) and an erasable programmable read only memory (EPROM). The memory may include one memory element or include a plurality of memory elements.

At least one processor that configures the main controller 500 and the timing controller 200 may execute programs stored in at least one memory. According to various embodiments, the main controller 500 may process a source signal input through the source input unit 540 and/or a source signal wirelessly received through the communication unit 530 to generate an image signal corresponding to the input source signal. For example, the main controller 500 may include a source decoder, a scaler, an image enhancer, and a graphics processor. The source decoder may decode the source signal compressed in a format such as moving picture expert group (MPEG), and the scaler may output image data of a desired resolution through resolution conversion.

The image enhancer may improve the image quality of the image data by applying various techniques of correction. The graphic processor may split the pixels of the image data into RGB data and output the RGB data together with a control signal such as a syncing signal for synchronizing display timing in the display panel 100. That is, the main controller 500 may output image data corresponding to the source signal and a control signal. Further, the main controller 500 may change the frame rate of the image data to correspond to the frame rate of the source signal. By doing so, the display device 10 may allow the frame rate to be variable according to the source signal, thereby enabling the source signal to be output without damage.

According to various embodiments, the main controller 500 and the timing controller 200 may be provided on a separate board or may be provided on the same board. For example, the main controller 500 may be provided on a main board, and the timing controller 200 may be provided on a driving board, but the disclosure is not limited thereto.

Figure 5A:
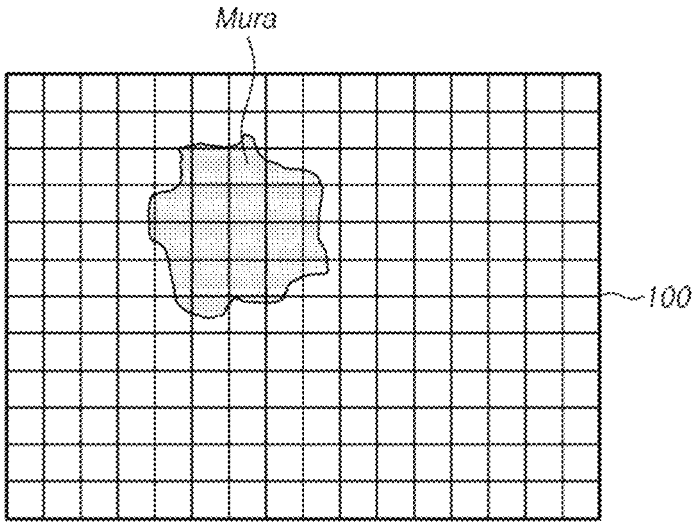
FIG. 5A and FIG. 5B are a diagrams illustrating an example of mura and mura data on a display panel according to one or more embodiments.
Figure 5B:
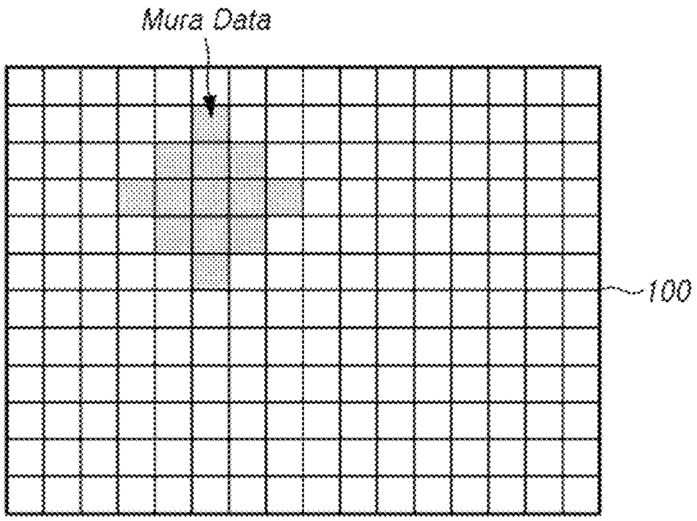

FIGS. 5A and 5B illustrate example mura and example mura data on the display panel 100 according to one or more embodiments.

Referring to FIGS. 1, 2, and 5, the display system 1 may detect mura visible from the display device 10, using the luminance measurement device 20, and generate mura data including position information and luminance information for a mura area, using the luminance compensation device 30.

The luminance measurement device 20 may measure luminance for each position according to a test area by photographing a test image displayed on the display device. On the display panel 100, a mura area having different luminance for the same test image may exist. For example, as shown in FIG. 5A, since the mura area has the luminance different from that of a surrounding area, the display quality may deteriorate.

The luminance compensation device 30 may convert the mura area into data based on the luminance data. For example, the luminance compensation device 30 may identify a mura area from the luminance data and generate mura data including position information and luminance information about the mura area. As shown in FIG. 5B, the mura data may include pixel-specific luminance information of the mura area according to the position on the display panel 100. For example, the luminance compensation device 30 may generate compensation data for controlling the luminance of the display device based on the mura data.

Figure 6:
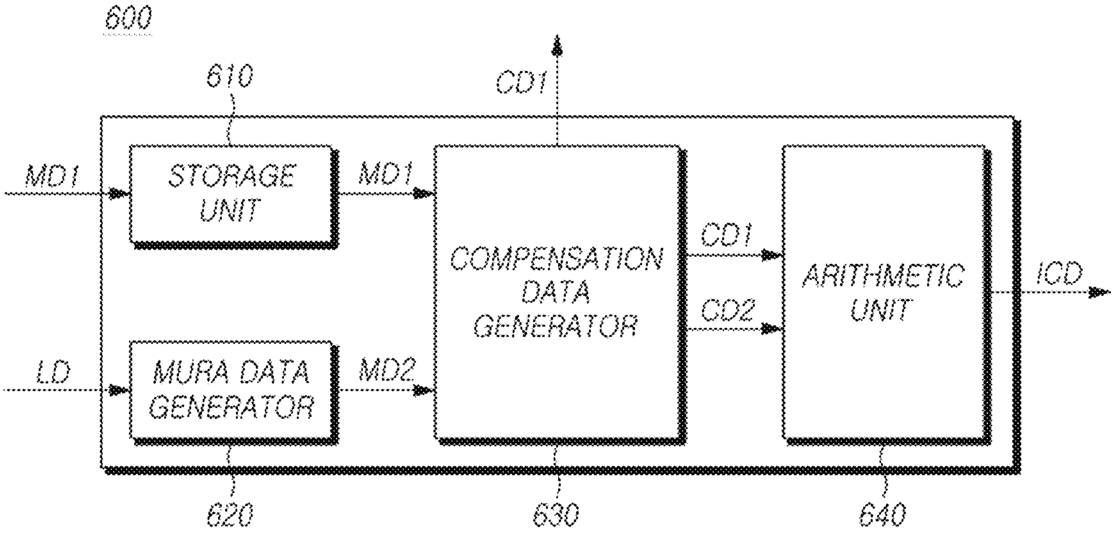
FIG. 6 is a diagram illustrating an example block configuration of a luminance compensator according to one or more embodiments.
Figure 7:
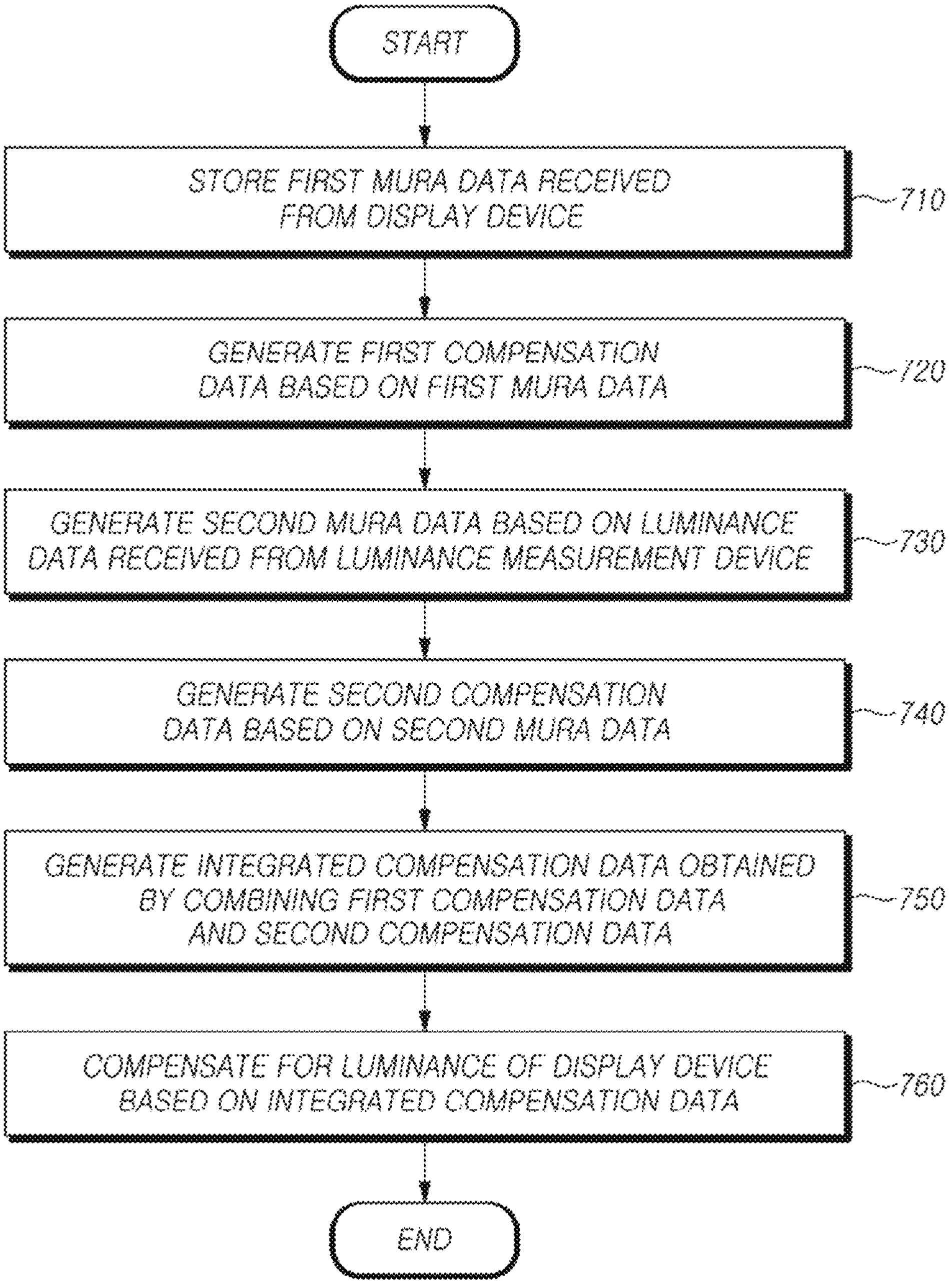
FIG. 7 is a diagram illustrating an example operating sequence of a luminance compensator according to one or more embodiments.
Figure 8:
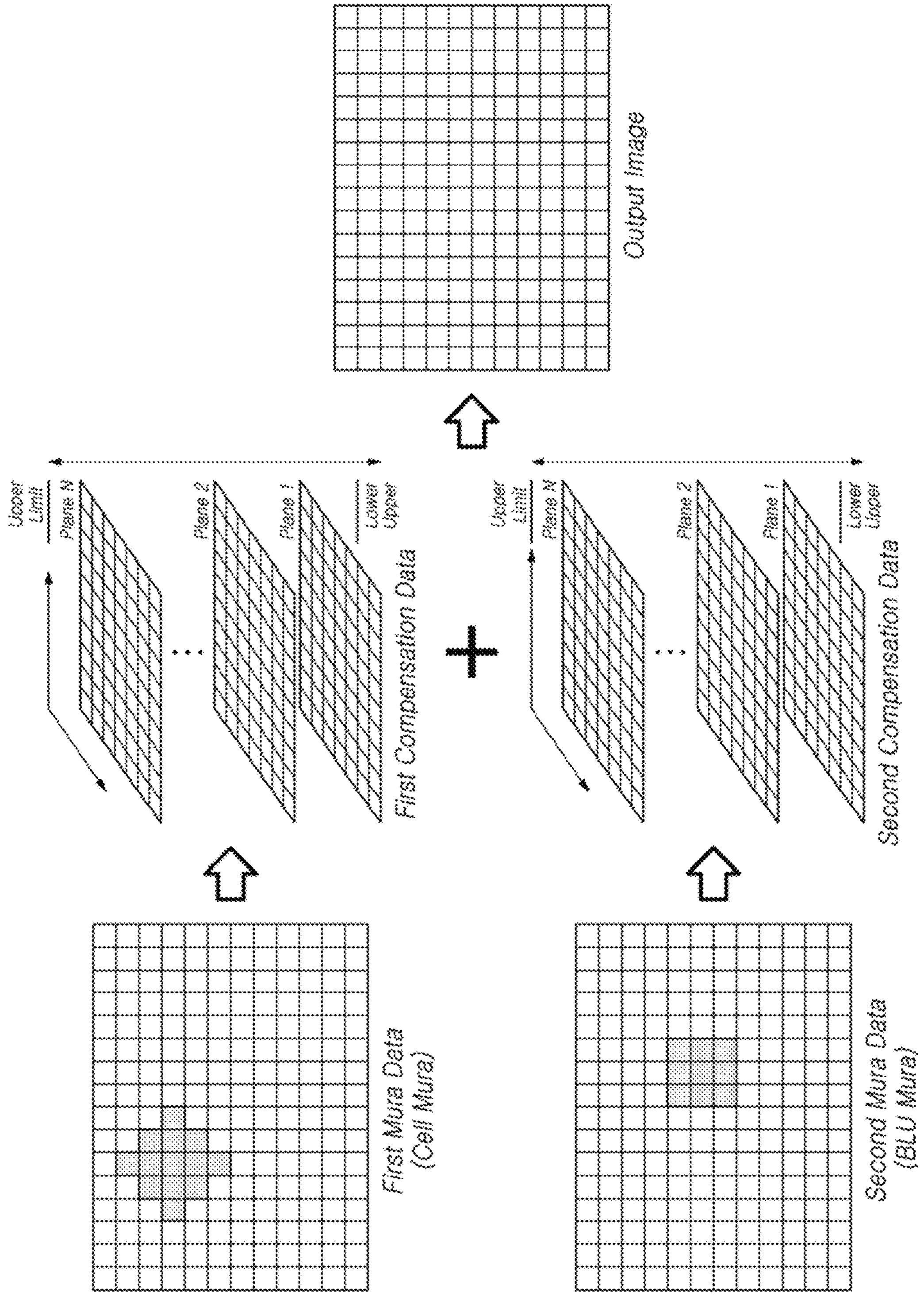
FIG. 8 is a diagram illustrating example compensation data of a display device and an example output image to which the compensation data is applied according to one or more embodiments.

FIG. 6 illustrates an example block configuration of the luminance compensator 600 according to one or more embodiments. FIG. 7 illustrates an example operating sequence of the luminance compensator 600 according to one or more embodiments. FIG. 8 illustrates example compensation data of a display device and an example output image to which the compensation data is applied according to one or more embodiments. Hereinafter, in FIGS. 6 to 8, a luminance compensation operation will be described based on the luminance compensator 600 included in the display device.

The luminance compensator 600 (e.g., the luminance compensator 30 of FIG. 1) according to embodiments of the disclosure may include at least one processor. The at least one processor may include one or more of a central processing unit (CPU), a many integrated core (MIC), a field-programmable gate array (FPGA), a digital signal processor (DSP), a hardware accelerator, or the like. The at least one processor is able to perform control of any one or any combination of the other components of the luminance compensator or the display device, and/or perform an operation or data processing relating to communication. Further, referring to FIGS. 6 and 7, the luminance compensator 600 may include a storage unit 610 for storing data, a mura data generator 620 for generating mura data of the display device 10, a compensation data generator 630 for generating compensation data based on the mura data, and an arithmetic unit 640 for performing an operation for luminance compensation. The luminance compensator 600 may be a partial component (e.g., the luminance compensator 600 of FIG. 3) of the display device 10 or an independent component (e.g., the luminance compensator 30 of FIG. 1) separate from the display device 10. The at least one processor that configures the luminance compensator 600 may be configured to execute one or more programs stored in a memory. By the processor executing one or more programs stored in the memory, this enables the luminance compensator 600 to be operated to perform at least one function according to the at least one instruction being executed. For instance, the luminance compensator 600 may be configured to store (operation 710) first mura data MD1 received from the display device 10, generate (operation 720) first compensation data CD1 based on the first mura data MD1, generate (operation 730) second mura data MD2 based on luminance data LD received from the luminance measurement device 20, generate (operation 740) second compensation data CD2 based on the second mura data MD2, generate (operation 750) integrated compensation data ICD obtained by summing the first compensation data CD1 and the second compensation data CD2, generate (operation 750) integrated compensation data ICD obtained by summing the first compensation data CD1 and the second compensation data CD2, and compensate for (operation 760) the luminance of the display device 10 based on the integrated compensation data ICD.

According to an embodiment, in operation 710, the luminance compensator 600 may store the first mura data MD1 received from the display device 10. For example, the luminance compensator 600 may receive the first mura data MD1 from the display device 10. For example, the storage unit 610 may store the first mura data MD1 received from the display device 10. For example, the first mura data MD1 may include a cell mura which took place during a manufacturing process of the display device 10. The storage unit 610 may transmit the first mura data MD1 to the compensation data generator 630.

According to an embodiment, in operation 720, the luminance compensator 600 may generate the first compensation data CD1 based on the first mura data MD1. For example, the compensation data generator 630 may generate the first compensation data CD1 based on the first mura data MD1. The first compensation data CD1 may include at least one of an Lookup Table (LUT) map including a compensation value corresponding to the cell mura which occurred during the manufacturing process of the display device 10, magnitude data including a luminance compensation amount for at least one unit pixel group, and offset data for adjusting the luminance compensation amount. For example, the LUT map (e.g., colormap) may include the compensation value corresponding to the cell mura when displaying an image according to input data. For example, the magnitude data may include the luminance compensation amount for each position of a unit pixel group in consideration of the cell mura. The offset data may include an adjustment value of the luminance compensation amount in consideration of a luminance difference between a cell mura area and a surrounding area and a luminance difference between pixels in the cell mura area.

For example, as shown in FIG. 8, the compensation data generator 630 may generate first compensation data CD1 to be used for 4-plane compensation for a first gray level, a second gray level, a third gray level, and a fourth gray level of at least one unit pixel group (e.g., eight pixels). For example, the first gray level may be any one of 0 to 16 grayscale levels. For example, the second gray level may be 32 grayscale level. For example, the third gray level may be any one of 64 to 128 grayscale levels. For example, the fourth gray level may be any one of 192 to 224 grayscale levels.

The compensation data generator 630 may transmit the first compensation data CD1 to the display device 10. The display device 10 may control luminance and gradation of an image based on the first compensation data CD1. For example, the display device 10 may display a test image to which the first compensation data CD1 is applied.

According to an embodiment, in operation 730, the luminance compensator 600 may generate the second mura data MD2 based on the luminance data LD received from the luminance measurement device 20. For example, the luminance measurement device 20 may generate the luminance data LD based on the test image displayed by the display device 10. The test image may be an image in which luminance (e.g., brightness and gradation) for the cell mura is compensated based on the first compensation data CD1. The luminance measurement device 20 may transmit the luminance data LD to the luminance compensator 600. The mura data generator 620 may receive the luminance data LD and generate the second mura data MD2 including position information and luminance information for the mura area having a luminance higher than that of the surrounding area or a luminance lower than that of the surrounding area, based on the luminance data LD. For example, the second mura data MD2 may include a backlight unit (BLU) mura detected in an operating process of the display device 10. The mura data generator 620 may transmit the second mura data MD2 to the compensation data generator 630.

According to an embodiment, in operation 740, the luminance compensator 600 may generate the second compensation data CD2 based on the second mura data MD2. For example, the compensation data generator 630 may generate the second compensation data CD2 based on the second mura data MD2. The second compensation data CD2 may include at least one of an LUT map including a compensation value corresponding to the backlight unit mura detected in the operating process of the display device 10, magnitude data including a luminance compensation amount for at least one unit pixel group and offset data for adjusting the luminance compensation amount. For example, the LUT map may include a compensation value corresponding to the backlight unit mura when displaying an image based on input data. For example, the magnitude data may include the luminance compensation amount for each position of a unit pixel group in consideration of the backlight unit mura. The offset data may include an adjustment value of the luminance compensation amount in consideration of a luminance difference between a backlight unit mura area and a surrounding area and a luminance difference between pixels in the backlight unit mura area.

For example, as shown in FIG. 8, the compensation data generator 630 may generate second compensation data CD2 to be used for 5-plane compensation for a first gray level, a second gray level, a third gray level, a fourth gray level, and a fifth gray level of at least one unit pixel group (e.g., eight pixels). For example, the first gray level may be any one of 0 to 16 grayscale levels. For example, the second gray level may be 32 grayscale level. For example, the third gray level may be any one of 64 to 128 grayscale levels. For example, the fourth gray level may be any one of 192 to 224 grayscale levels. For example, the fifth gray level may be 255 grayscale level.

The compensation data generator 630 may transmit the first compensation data CD1 and the second compensation data CD2 to the arithmetic unit 640.

According to an embodiment, in operation 750, the luminance compensator 600 may generate the integrated compensation data ICD obtained by summing (e.g., combining) the first compensation data CD1 and the second compensation data CD2. For example, as shown in FIG. 8, the arithmetic unit 640 may generate the integrated compensation data ICD obtained by summing (e.g., combining) the first compensation data CD1 and the second compensation data CD2. The arithmetic unit 640 may extract (or restore) the LUT map, the magnitude data, and the offset data included in each of the first compensation data CD1 and the second compensation data CD2, by decoding the first compensation data CD1 and the second compensation data CD2.

The arithmetic unit 640 may sum up (e.g., combine) the LUT map, the magnitude data, and the offset data of the first compensation data CD1 and the second compensation data CD2. For example, the arithmetic unit 640 may sum up (e.g., combine) the LUT map of the first compensation data CD1 and the LUT map of the second compensation data CD2, based on a summation algorithm. For example, the arithmetic unit 640 may sum up (e.g., combine) the magnitude data of the first compensation data CD1 and the magnitude data of the second compensation data CD2, based on the summation algorithm. For example, the arithmetic unit 640 may sum up the offset data of the first compensation data CD1 and the offset data of the second compensation data CD2, based on the summation algorithm.

The arithmetic unit 640 may generate the integrated compensation data ICD by encoding the summed LUT map, the summed magnitude data, and the summed offset data. For example, the integrated compensation data ICD may include the LUT map including the compensation value corresponding to the cell mura in which occurred during the manufacturing process of the display device 10 and the backlight unit mura detected in the operating process of the display device 10, the magnitude data including the luminance compensation amount for at least one unit pixel group, and the offset data for adjusting the luminance compensation amount. The arithmetic unit 640 may transmit the integrated compensation data ICD to the timing controller 200 of the display device 10.

According to an embodiment, in operation 760, the luminance compensator 600 may compensate for the luminance of the display device 10 based on the integrated compensation data ICD. For example, the arithmetic unit 640 may compensate for the luminance of the display device 10 by transmitting the integrated compensation data ICD to the timing controller 200 of the display device 10. For example, the timing controller 200 may receive the integrated compensation data ICD including at least one of the LUT map, the magnitude data, and the offset data from the luminance compensator 600. The timing controller 200 may control the luminance of the image corresponding to the input data based on offset data. The timing controller 200 may control a grayscale of the image corresponding to the input data based on the LUT map and the magnitude data.

In an embodiment, the display device 10 may compensate for the luminance of the image corresponding to the input data based on the integrated compensation data ICD, and then perform an additional luminance compensation. For example, the display panel 100 may display the test image to which the integrated compensation data ICD is applied. For example, the luminance measurement device 20 may generate complementary luminance data LD based on the test image of the display panel 100. For example, the luminance compensator 600 may generate third mura data based on the complementary luminance data LD received from the luminance measurement device 20.

The luminance compensator 600 may generate the complementary integrated compensation data ICD based on the third mura data. For example, the luminance compensator 600 may generate third compensation data based on the third mura data. For example, the luminance compensator 600 may generate the complementary integrated compensation data ICD obtained summing (e.g., combining) the first compensation data CD1, the second compensation data CD2, and the third compensation data. For example, the luminance compensator 600 may additionally compensate for the luminance of the display device 10 by transmitting the complementary integrated compensation data ICD to the timing controller 200.

Meanwhile, the additional luminance compensation of the display device 10 may be repeatedly performed, in which case in addition to the third compensation data, fourth compensation data, fifth compensation data, . . . , nth compensation data may be further generated, thereby increasing the accuracy of the luminance compensation of the display device 10.

As described above, the display device 10 may, as disclosed herein, generate the first compensation data CD1 for removing (e.g., correcting or remedying) the cell mura that took place during the manufacturing process, generate the second compensation data CD2 for removing the backlight unit mura detected in the operating process, and perform the luminance compensation based on the integrated compensation data ICD obtained by summing (e.g., combining) the first compensation data CD1 and the second compensation data CD2.

Accordingly, the display device 10 according to the disclosure may remove the mura of the display device 10 through the integrated compensation data ICD in which the compensation data for the cell mura and the compensation data for the backlight unit mura are summed up (e.g., combined), thereby eliminating (or reducing) the problem of the mura being visible and improving display quality.

Figure 9:
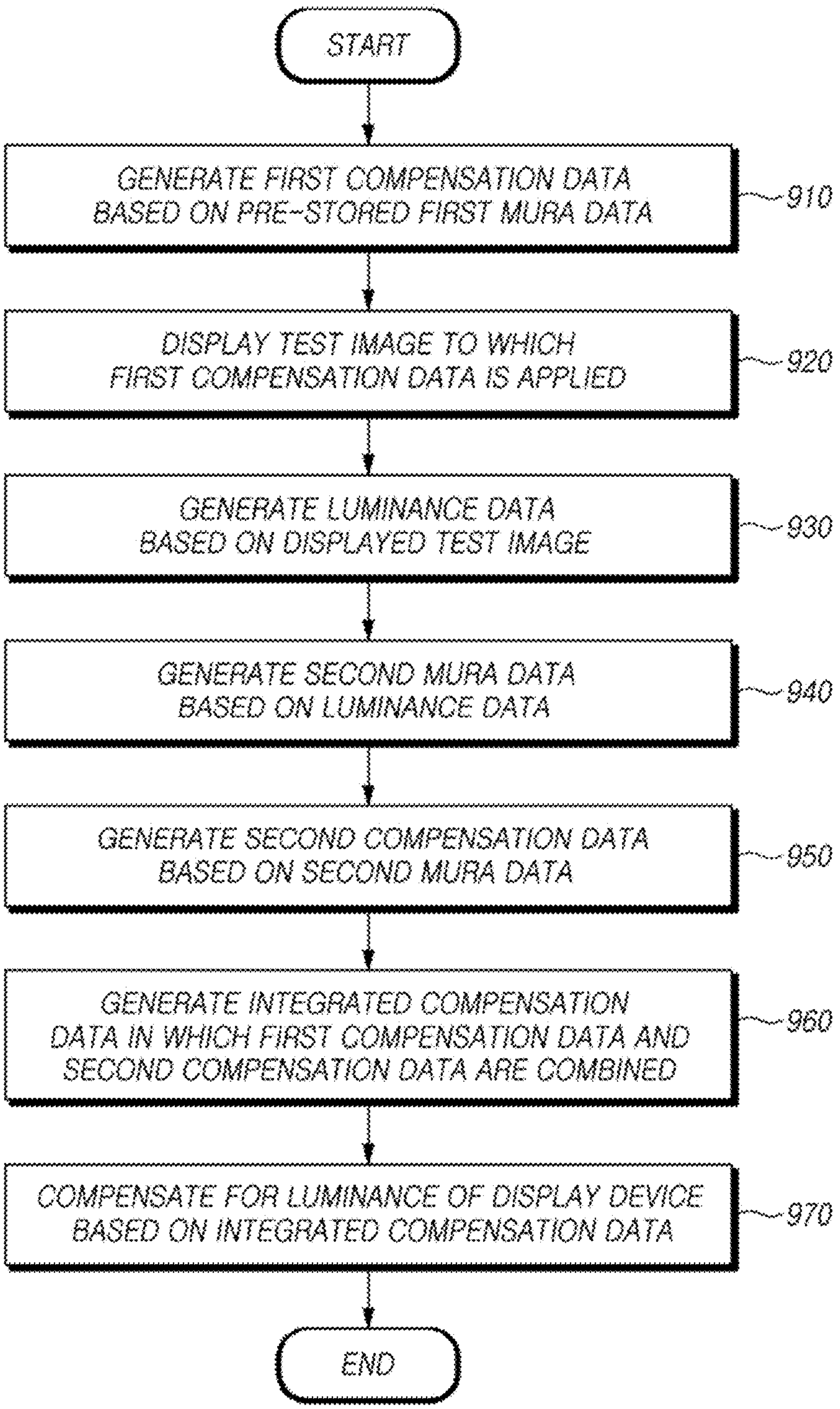
FIG. 9 is a sequence diagram of an example manufacturing method of a display device according to one or more embodiments.

FIG. 9 illustrates an example method of manufacturing the display device 10 according to one or more embodiments.

Referring to FIG. 9, the method of manufacturing the display device of the disclosure may include generating first compensation data based on pre-stored first mura data (operation 910), displaying a test image to which the first compensation data is applied (operation 920), generating luminance data based on the displayed test image (operation 930), generating second mura data based on the luminance data (operation 940), generating second compensation data based on the second mura data (operation 950), generating integrated compensation data in which the first compensation data and the second compensation data are summed up (operation 960), and performing compensation for luminance of the display device based on the integrated compensation data (operation 970).

For example, the first mura data may include a cell mura in which took place during a manufacturing process of the display device. For example, the second mura data may include a backlight unit (BLU) mura detected in an operating process of the display device.

In an embodiment, the first compensation data and the second compensation data may include at least one of an LUT map including a compensation value corresponding to mura data, magnitude data including a luminance compensation amount for at least one unit pixel group and offset data for adjusting the luminance compensation amount.

In an embodiment, an operation of generating of the integrated compensation data may include extracting (e.g., obtaining) the LUT map, the magnitude data, and the offset data by decoding the first compensation data and the second compensation data, summing up (e.g., combining) the LUT map of the first compensation data and the LUT map of the second compensation data, based on a summation algorithm, summing up (e.g., combining) the magnitude data of the first compensation data and the magnitude data of the second compensation data, based on the summation algorithm, and summing up (e.g., combining) the offset data of the first compensation data and the offset data of the second compensation data.

In an embodiment, an operation of generating of the integrated compensation data may include generating the integrated compensation data by encoding the summed LUT map, the summed magnitude data, and the summed offset data.

As described above, the method of manufacturing the display device of the disclosure may remove the mura of the display device through the integrated compensation data in which the compensation data for the cell mura and the compensation data for the backlight unit mura are summed up (e.g., combined), thereby eliminating (or reducing) the problem of the mura being visible and improving the display quality. However, since such an advantageous effect has been described above in detail, redundant descriptions thereof will be omitted herein.

The display device, according to various embodiments as disclosed herein, may be one of various types of electronic devices. The display device may include, for example, a portable communication device (e.g., a smartphone), a computer device, a portable multimedia device, a portable medical device, a camera, a wearable device, or a home appliance. The display devices according to embodiments of the disclosure are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used for similar or related components. The singular form of a noun corresponding to an item may include one or more of the items, unless the relevant context clearly dictates otherwise. As used herein, each of such phrases as “A or B”, “at least one of A and B”, “at least one of A or B”, “A, B, or C”, “at least one of A, B, and C”, and “at least one of A, B, or C” may include any one of or all possible combinations of the items enumerated together in a corresponding one of the phrases. As used herein, such terms as “1st”, “2nd”, or “first” or “second” may be used to simply distinguish a corresponding component from another and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic”, “logic block”, “part”, or “circuit”. Such a module may be a single integral component, or a minimum unit or a part of the component, adapted to perform one or more functions. For example, according to an embodiment, the module may be implemented in the form of an application-specific integrated circuit (ASIC).

Various embodiments as set forth herein may be implemented as software (e.g., a program) including one or more instructions stored in a storage medium (e.g., internal memory or external memory) that is readable by a machine (e.g., an electronic device, the display device, the luminance compensator, etc.). The storage medium may include a volatile memory such as a static random access memory (S-RAM) and a dynamic random access memory (D-RAM), and a non-volatile memory such as a read only memory (ROM) and an erasable programmable read only memory (EPROM). The memory may include one memory element or include a plurality of memory elements. For example, one or more processors of the machine may invoke at least one of the one or more stored instructions from the storage medium and execute the at least one instruction. The at least one processor may include one or more of a central processing unit (CPU), a many integrated core (MIC), a field-programmable gate array (FPGA), a digital signal processor (DSP), a hardware accelerator, or the like. The at least one processor may control any one of or any combination of the other components of the machine, and/or perform an operation or data processing relating to communication. By the at least one processor of the machine executing at least one instruction stored in the storage medium, this enables the machine to be operated to perform at least one function according to the at least one instruction invoked. The one or more instructions may include coded generated by a compiler or coded executable by an interpreter. The machine-readable storage medium may be provided in the form of a non-transitory storage medium. Here, the term ‘non-transitory' only means that the storage medium is a tangible device and does not include a signal (e.g., an electromagnetic wave), and the term does not distinguish between a circumstance where data is semi-permanently stored in the storage medium and a circumstance where data is temporarily stored in the storage medium.

According to an embodiment, a method, according to various embodiments disclosed herein, may be included and provided in a computer program product. The computer program products are commodities than may be traded between sellers and buyers. The computer program product may be distributed in the form of a machine-readable storage medium (e.g., compact disc read only memory (CD-ROM)), or may be distributed (e.g., downloaded or uploaded) online through an application store (e.g., PlayStore™) or directly between two user devices (e.g., smart phones). If distributed online, at least part of the computer program product may be at least temporarily stored or generated in a machine-readable storage medium, such as memories of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more components or operations of the above-described components may be omitted, or one or more other components or operations may be added thereto. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of compensating for luminance of a display device, comprising:

generating first compensation data based on pre-stored first mura data;

displaying a test image according to the first compensation data, wherein a luminance of the test image is compensated based on the first compensation data;

generating second mura data based on the displayed test image;

generating second compensation data based on the second mura data;

generating integrated compensation data based on a combination of the first compensation data and the second compensation data; and compensating for luminance of the display device based on the integrated compensation data.

2. The method of claim 1, wherein the first mura data includes data of a cell mura based on a manufacturing process of the display device.

3. The method of claim 1, wherein the second mura data includes data of a backlight unit mura based on an operating process of the display device.

4. The method of claim 1, wherein the first compensation data includes luminance correction data for at least one gray level of at least one unit pixel group included in the display device, and be used for 4-plane compensation for a first gray level, a second gray level, a third gray level, and a fourth gray level of the at least one unit pixel group.

5. A method of compensating for luminance of a display device, comprising:

generating first compensation data based on pre-stored first mura data;

displaying a test image according to the first compensation data;

generating second mura data based on the displayed test image;

generating second compensation data based on the second mura data;

generating integrated compensation data based on a combination of the first compensation data and the second compensation data; and compensating for luminance of the display device based on the integrated compensation data, wherein the second compensation data includes luminance correction data for at least one gray level of at least one unit pixel group included in the display device, and be used for 5-plane compensation for a first gray level, a second gray level, a third gray level, a fourth gray level, and a fifth gray level of the at least one unit pixel group.

6. The method of claim 1, wherein the first compensation data and the second compensation data include at least one of an LUT map including a compensation value corresponding to mura data, magnitude data including a luminance compensation amount for at least one unit pixel group, and offset data for adjusting the luminance compensation amount.

7. The method of claim 6, wherein the generating the integrated compensation data comprises:

extracting the LUT map, the magnitude data, and the offset data by decoding the first compensation data and the second compensation data;

combining the LUT map of the first compensation data and the LUT map of the second compensation data, based on a summation algorithm;

combining the magnitude data of the first compensation data and the magnitude data of the second compensation data, based on the summation algorithm; and combining the offset data of the first compensation data and the offset data of the second compensation data, based on the summation algorithm.

8. The method of claim 7, wherein the generating the integrated compensation data further comprises encoding the at least one of the combined LUT map, the combined magnitude data, and the combined offset data.

9. The method of claim 1, wherein compensating for the luminance of the display device comprises:

receiving the integrated compensation data including at least one of an LUT map, magnitude data, and offset data;

controlling a luminance of the image corresponding to input data based on the offset data; and controlling a gradation of the image corresponding to the input data based on at least one of the LUT map and the magnitude data.

10. The method of claim 1, further comprising:

displaying the test image according to the integrated compensation data;

generating complementary luminance data based on the displayed test image;

generating third mura data based on the complementary luminance data;

generating third compensation data based on the third mura data;

generating complementary integrated compensation data based on a combination of the first compensation data, the second compensation data, and the third compensation data; and additionally compensating for the luminance of the display device based on the complementary integrated compensation data.

11. A display device, comprising:

a display panel configured to display an image;

a timing controller configured to control a data signal and a gate signal; and a luminance compensator configured to compensate for luminance of the image displayed on the display panel, wherein the luminance compensator is configured to generate first compensation data based on pre-stored first mura data, wherein the display panel is configured to display a test image according to the first compensation data, wherein a luminance of the test image is compensated based on the first compensation data, and wherein the luminance compensator is configured to:

generate second mura data based on luminance data comprising a luminance distribution of the displayed test image, generate second compensation data based on the second mura data, generate integrated compensation data based on a combination of the first compensation data and the second compensation data, and compensate for the luminance of the image displayed on the display panel based on the integrated compensation data.

12. The display device of claim 11, wherein the first mura data comprises data of a cell mura based on a manufacturing process of the display device.

13. The display device of claim 11, wherein the second mura data comprises data of a backlight unit mura based on an operating process of the display device.

14. The display device of claim 11, wherein the first compensation data and the second compensation data comprise luminance correction data for at least one gray level of at least one unit pixel group included in the display device.

15. The display device of claim 14, wherein the luminance compensator is further configured to:

generate the first compensation data to be used for 4-plane compensation for a first gray level, a second gray level, a third gray level, and a fourth gray level of the at least one unit pixel group; and generate the second compensation data to be used for 5-plane compensation for the first gray level, the second gray level, the third gray level, the fourth gray level, and a fifth gray level of the at least one unit pixel group.

16. The display device of claim 11, wherein the first compensation data and the second compensation data comprise at least one of an LUT map corresponding to mura data, magnitude data comprising a luminance compensation amount for at least one unit pixel group, and offset data for adjusting the luminance compensation amount.

17. The display device of claim 16, wherein the luminance compensator is further configured to:

extract the LUT map, the magnitude data, and the offset data, by decoding the first compensation data and the second compensation data;

combine the LUT map of the first compensation data and the LUT map of the second compensation data based on a summation algorithm, combine the magnitude data of the first compensation data and the magnitude data of the second compensation data based on the summation algorithm, and combine the offset data of the first compensation data and the offset data of the second compensation data based on the summation algorithm.

18. The display device of claim 17, wherein the luminance compensator generates the integrated compensation data by encoding the at least one of the combined LUT map, the combined magnitude data, and the combined offset data.

19. The display device of claim 11, wherein the timing controller is further configured to:

receive the integrated compensation data including at least one of an LUT map, magnitude data, and offset data from the luminance compensator;

control a luminance of the image corresponding to input data based on the offset data; and control a gradation of the image corresponding to the input data based on at least one of the LUT map and the magnitude data.

20. The display device of claim 11, wherein the display panel is further configured to display the test image according to the integrated compensation data, and wherein the luminance compensator is further configured to:

generate third mura data based on complementary luminance data including a luminance distribution of the displayed test image, generate third compensation data based on the third mura data, generate complementary integrated compensation data based on a combination of the first compensation data, the second compensation data, and the third compensation data, and additionally compensate for the luminance of the image displayed on the display panel based on the complementary integrated compensation data.

* * * * *